(12) United States Patent
Calman et al.

(10) Patent No.: US 10,369,771 B2
(45) Date of Patent: Aug. 6, 2019

(54) ADHESIVE SHEET MATERIAL APPLICATION SQUEEGEE

(71) Applicants: Kenneth J. Calman, Fort Lauderdale, FL (US); Kathryn S. Calman, Fort Lauderdale, FL (US)

(72) Inventors: Kenneth J. Calman, Fort Lauderdale, FL (US); Kathryn S. Calman, Fort Lauderdale, FL (US)

(*) Notice: Subject to any disclaimer, the term of this patent is extended or adjusted under 35 U.S.C. 154(b) by 0 days.

(21) Appl. No.: 15/986,101

(22) Filed: May 22, 2018

(65) Prior Publication Data

US 2018/0264795 A1 Sep. 20, 2018

Related U.S. Application Data

(60) Continuation of application No. 15/144,447, filed on May 2, 2016, now Pat. No. 9,975,319, which is a continuation of application No. 14/673,534, filed on Mar. 30, 2015, now Pat. No. 9,327,480, which is a division of application No. 14/294,137, filed on Jun. 2, 2014, now Pat. No. 9,327,479.

(60) Provisional application No. 61/956,067, filed on Jun. 1, 2013.

(51) Int. Cl.
| | | |
|---|---|---|
| B44C 1/00 | (2006.01) |
| B44C 1/10 | (2006.01) |
| B44C 7/02 | (2006.01) |
| B44C 7/06 | (2006.01) |
| B44C 7/08 | (2006.01) |
| B29C 65/00 | (2006.01) |
| B29C 65/48 | (2006.01) |
| B29C 65/78 | (2006.01) |
| B32B 37/00 | (2006.01) |
| B32B 37/10 | (2006.01) |
| B32B 37/12 | (2006.01) |
| B44C 1/165 | (2006.01) |

(52) U.S. Cl.
CPC .......... *B32B 37/1284* (2013.01); *B29C 65/48* (2013.01); *B29C 65/785* (2013.01); *B29C 66/343* (2013.01); *B29C 66/8122* (2013.01); *B29C 66/828* (2013.01); *B29C 66/83* (2013.01); *B29C 66/861* (2013.01); *B32B 37/0046* (2013.01); *B32B 37/10* (2013.01); *B44C 1/105* (2013.01); *B32B 2037/109* (2013.01); *B32B 2037/1081* (2013.01); *B44C 1/00* (2013.01); *B44C 1/165* (2013.01); *B44C 7/02* (2013.01); *B44C 7/06* (2013.01); *B44C 7/08* (2013.01); *Y10T 156/1788* (2015.01); *Y10T 156/18* (2015.01)

(58) Field of Classification Search
CPC ............. Y10T 156/1788; Y10T 156/18; B29C 2063/027; B29C 63/0047; B44C 7/02; B44C 7/06; B44C 7/08; B44C 1/00; B44C 1/165
See application file for complete search history.

(56) References Cited

U.S. PATENT DOCUMENTS 4,209,865 A * 7/1980 Kozlowski ............... B44C 7/06
  15/245.1
6,962,741 B2 * 11/2005 Bogman ................... B44C 1/10
  15/121

(Continued)

*Primary Examiner* — Carson Gross
(74) *Attorney, Agent, or Firm* — Ice Miller LLP

(57) ABSTRACT

Adhesive sheet material application squeegees are disclosed.

15 Claims, 8 Drawing Sheets

(56) References Cited

U.S. PATENT DOCUMENTS

2006/0118246 A1\* 6/2006 Williams ............ B29C 63/0047
156/579
2009/0308540 A1\* 12/2009 Puckett, Jr. ............... B44C 7/06
156/574

\* cited by examiner

… (1)

ADHESIVE SHEET MATERIAL APPLICATION SQUEEGEE

RELATED APPLICATION DATA

This application is a continuation of and claims the benefit of prior U.S. patent application Ser. No. 15/144,447, filed on May 2, 2016, now U.S. Pat. No. 9,975,319, which is a continuation of U.S. patent application Ser. No. 14/673,534, filed Mar. 30, 2015, now U.S. Pat. No. 9,327,480, which is a divisional application of U.S. patent application Ser. No. 14/294,137, filed Jun. 2, 2014, now U.S. Pat. No. 9,327,479, which claims the benefit of U.S. Provisional Application No. 61/956,067 filed Jun. 1, 2013, which applications are incorporated herein by reference in their entirety.

FIELD OF THE DISCLOSED EMBODIMENTS

The present disclosure relates to the application of adhesive sheet materials, and, more particularly, an arc squeegee and method for applying adhesive sheet materials.

BACKGROUND

Adhesive sheet materials are becoming the increasingly popular choice for advertising or otherwise displaying graphics on signs, automobiles, indoor and outdoor walls, indoor and outdoor floors, indoor and outdoor ceilings, buildings, and numerous other surfaces. Adhesive sheet materials typically have a display side bearing desired graphics, colors, texture, images, and/or text, and an application side that is coated with an adhesive substance and allows for application to various surfaces. The adhesive sheet material is typically applied in oversized sections and then cut or shaped to the desired shape and size. The size of the oversized sections and the size of the surface to which the adhesive sheet material is being applied vary greatly depending on the application.

One type of adhesive sheet material, which is commonly used in the vehicle wrap industry is vinyl paint wraps. Although vinyl paint wraps are common, vehicles can be customized using a variety of adhesive sheet materials and the customization can include, but is not limited to including, body color change and/or texture change.

Adhesive sheet materials are applied to surfaces that have a variety of unique features, such as contours, welded obstacles, edges, texture, and elements such as handles or windows. It is desirable to shape the adhesive sheet material around the surfaces' unique features. The adhesive sheet material is best applied once gently heated during the application process, the heat serving both to activate the adhesive and to render the adhesive sheet material more pliable and thus amenable to compliance with the application to the surface and its unique features. Generally, a heat source, such as a propane or other combustible gas torch is used to heat the adhesive sheet material.

Application of adhesive sheet material is a pressure sensitive process. Applying the wrong amount of pressure can result in improper installation of the adhesive sheet material. Difficulties often arise during application of adhesive sheet material to variations in the surface or irregular surface features, such as contours, welded obstacles, edges, texture, and elements such as handles or windows. Issues can arise if too little, too much, or non-uniform pressure is applied when installing the adhesive sheet material to variations in the surface or irregular surface features. These issues include gaps, air bubbles, or air-pockets in-between the surface and the adhesive sheet material and post application lifting of the adhesive sheet material from the surface caused by shrinkage of the adhesive sheet material after being overstretched. If the adhesive sheet material is not properly adhered to the surface, it can result in aesthetic problems, peeling off of the adhesive sheet material, and/or premature delamination from the adhesive sheet material causing future failure.

Currently, the art lacks a reliable and desirable apparatus and method for flawlessly applying adhesive sheet material to variations in the surface or irregular surface features, applying the correct pressure, and preventing gaps, air bubbles, air-pockets, and lifting between the surface and the adhesive sheet material.

Accordingly, there is a need for a device and a method to facilitate the positioning, affixing, applied pressure, user exertion, and smoothing of the adhesive sheet material to the desired surface.

BRIEF SUMMARY

The present disclosure fills the need for a device and method that facilitates and addresses the shortcomings of the current devices for applying sections of adhesive sheet material to variations in the surface or irregular surface features and preventing gaps, air bubbles, air-pockets, and lifting between the surface and the adhesive sheet material.

According to one aspect of the present disclosure, an adhesive sheet material application squeegee is disclosed. The squeegee includes a first edge, a first gripping surface and at least one cover. The at least one cover is capable of being secured over the first edge and the first gripping surface. The first edge comprises a convex arc.

According to one aspect of the present disclosure, an adhesive sheet material application squeegee is disclosed. The squeegee includes a first edge, a distal edge adjacent the first edge, a first gripping surface, and at least one cover. The at least one cover is capable of being secured over the first edge, the first gripping surface, and the distal edge. The first edge comprises a convex arc.

According to another aspect of the present disclosure, an adhesive sheet material application squeegee is disclosed. The squeegee includes a first edge, a distal edge adjacent the first edge, a first gripping surface, and at least one cover. The at least one cover is capable of being secured over the first edge and at least a portion of the first gripping surface. The first edge comprises two arcs with a straight portion between the two arcs.

BRIEF DESCRIPTION OF THE DRAWINGS

The embodiments described herein and other features, advantages, and disclosures contained herein, and the manner of attaining them, will become apparent and the present disclosure will be better understood by reference to the following description of various exemplary embodiments of the present disclosure taken in conjunction with the accompanying drawing, wherein.

Figure 1:
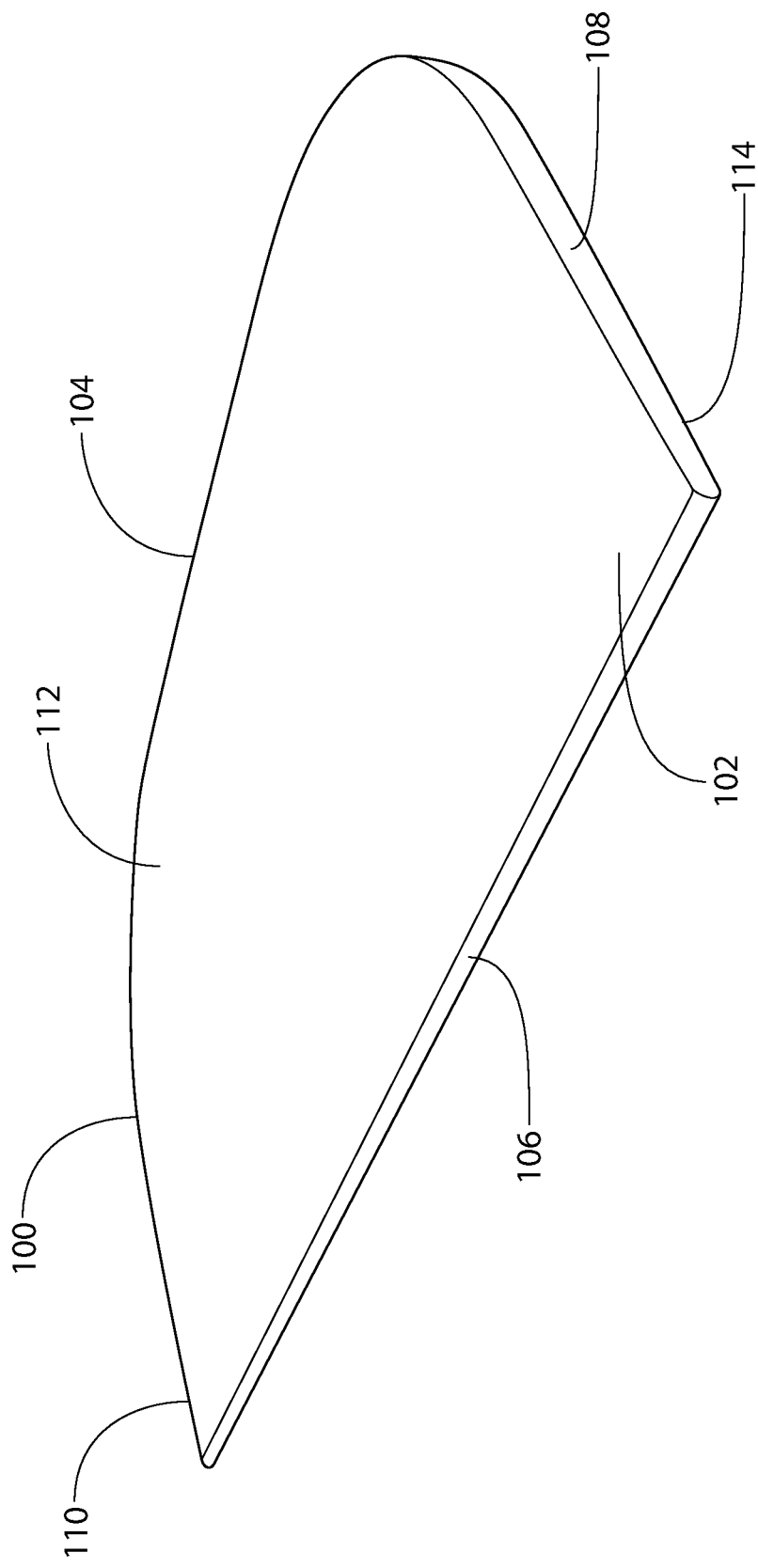
FIG. 1 is a perspective view of an adhesive sheet material arc application squeegee according to at least one embodiment of the present disclosure.

It should be understood that the appended drawings are not necessarily to scale, presenting a somewhat simplified representation of various preferred features illustrative of the basic principles of the disclosure. Certain features of the illustrated embodiments have been enlarged or distorted relative to others to facilitate visualization and clear understanding. In particular thin features may be thickened, for example, for clarity or illustration.

DETAILED DESCRIPTION

For the purposes of promoting an understanding of the principles of the present disclosure, reference will be made to the embodiments illustrated in the drawings, and specific language will be used to describe the same. It will nevertheless be understood that no limitation of the scope of this disclosure is thereby intended.

The present disclosure includes disclosure of adhesive sheet material arc application squeegees and methods for using the same. FIG. 1 shows an adhesive sheet material arc application squeegee 100 according to at least one embodiment of the present disclosure. The embodiment of the adhesive sheet material arc application squeegee 100 shown in FIG. 1 comprises a base 102, a first edge 104, a second edge 106, a proximal edge 108, a distal edge 110, a first gripping surface 112, and a second gripping surface 114. The first edge 104 comprises two arcs with a straight portion in-between the two arcs. Arc, as used throughout this disclosure, means a continuous piece of the circumference of a circle. The second edge 106 is straight. The proximal edge 108 is straight. The distal edge 110 is straight. As shown in FIG. 1, the first gripping surface 112 is flat. The second gripping surface 114 is flat. The adhesive sheet material arc application squeegee 100 allows a user to apply any of the four edges to a surface 500 while holding the base 102.

Figure 2:
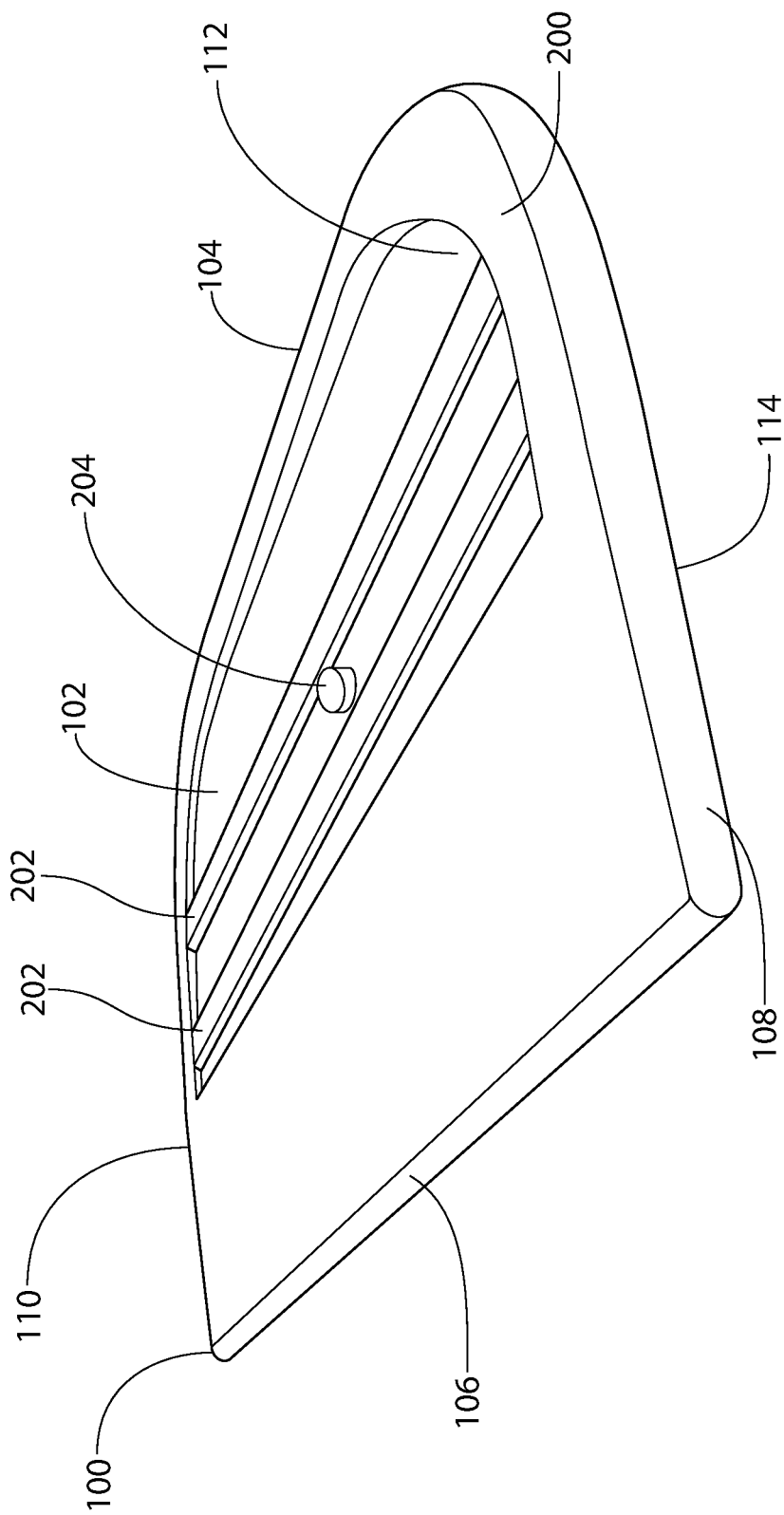
FIG. 2 is a perspective view of an adhesive sheet material arc application squeegee according to at least one embodiment of the present disclosure.

FIG. 2 shows an adhesive sheet material arc application squeegee 100 according to at least one embodiment of the present disclosure. The embodiment of the adhesive sheet material arc application squeegee 100 shown in FIG. 2 comprises a base 102, a first edge 104, and a second edge 106, a proximal edge 108, a distal edge 110, a first gripping surface 112, a second gripping surface 114, a cover 200, two ribs 202 and an anchor 204. The first edge 104 comprises two arcs with a straight portion in-between the two arcs. The second edge 106 is straight. The proximal edge 108 is straight. The distal edge 110 is straight. The cover 200 covers the first edge 104, second edge 106, proximal edge 108, and distal edge 110. The cover 200 is folded over each edge and secured to the first gripping surface 112 and the second gripping surface 114. A portion of the base 102 remains uncovered by the cover 200. The rib 202 protrudes off the first gripping surface 112. The rib 202 protrudes off the second gripping surface 114. The rib 202 surface is flat. The cover 200 does not cover the rib 202. The anchor 204 is located near the center of the base 102. The cover 200 does not cover the anchor 204. The adhesive sheet material arc application squeegee 100 allows a user to apply any of the covered edges to a surface 500 while holding the base 102.

Figure 3:
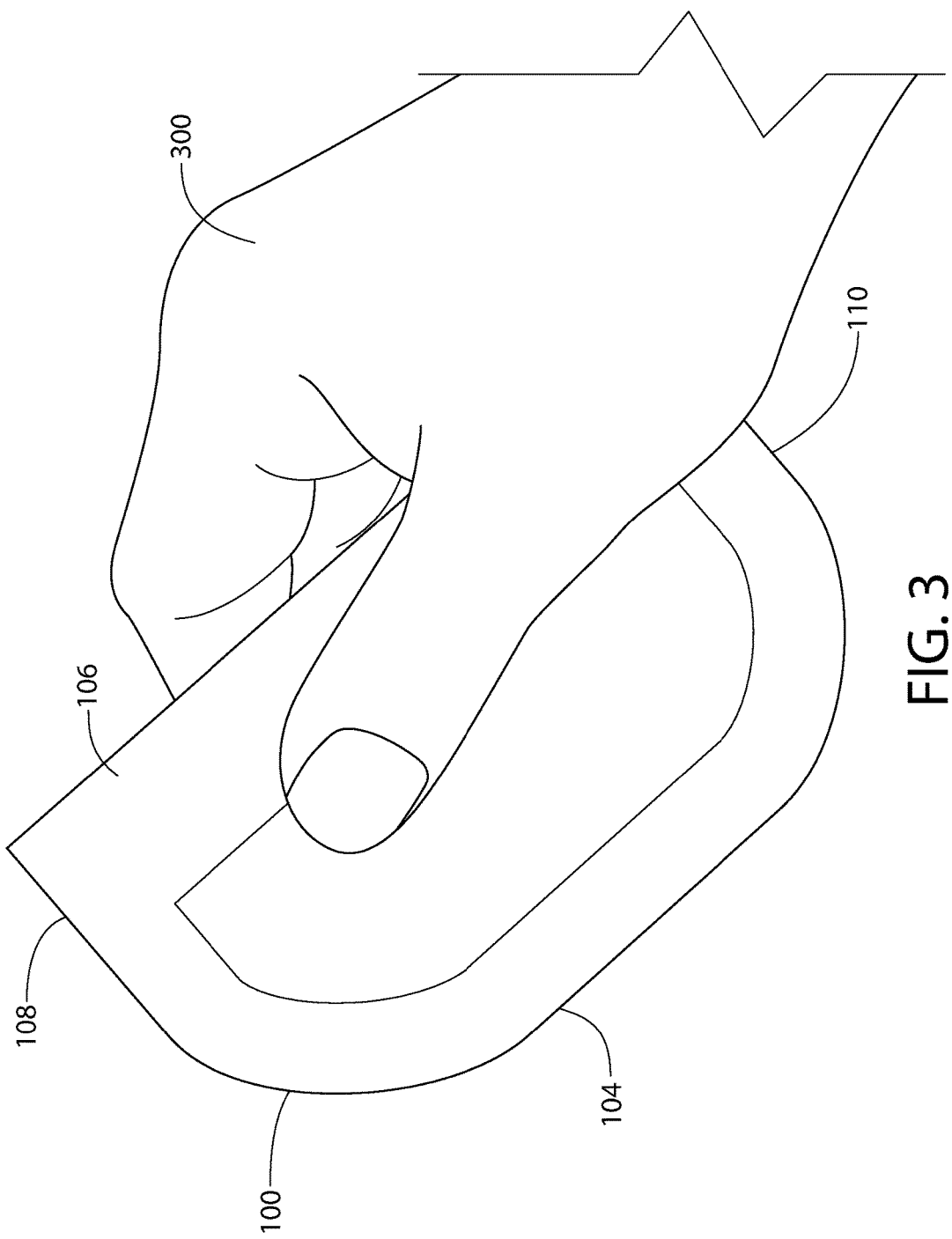
FIG. 3 is a top view of an adhesive sheet material arc application squeegee according to at least one embodiment of the present disclosure.
Figure 4:
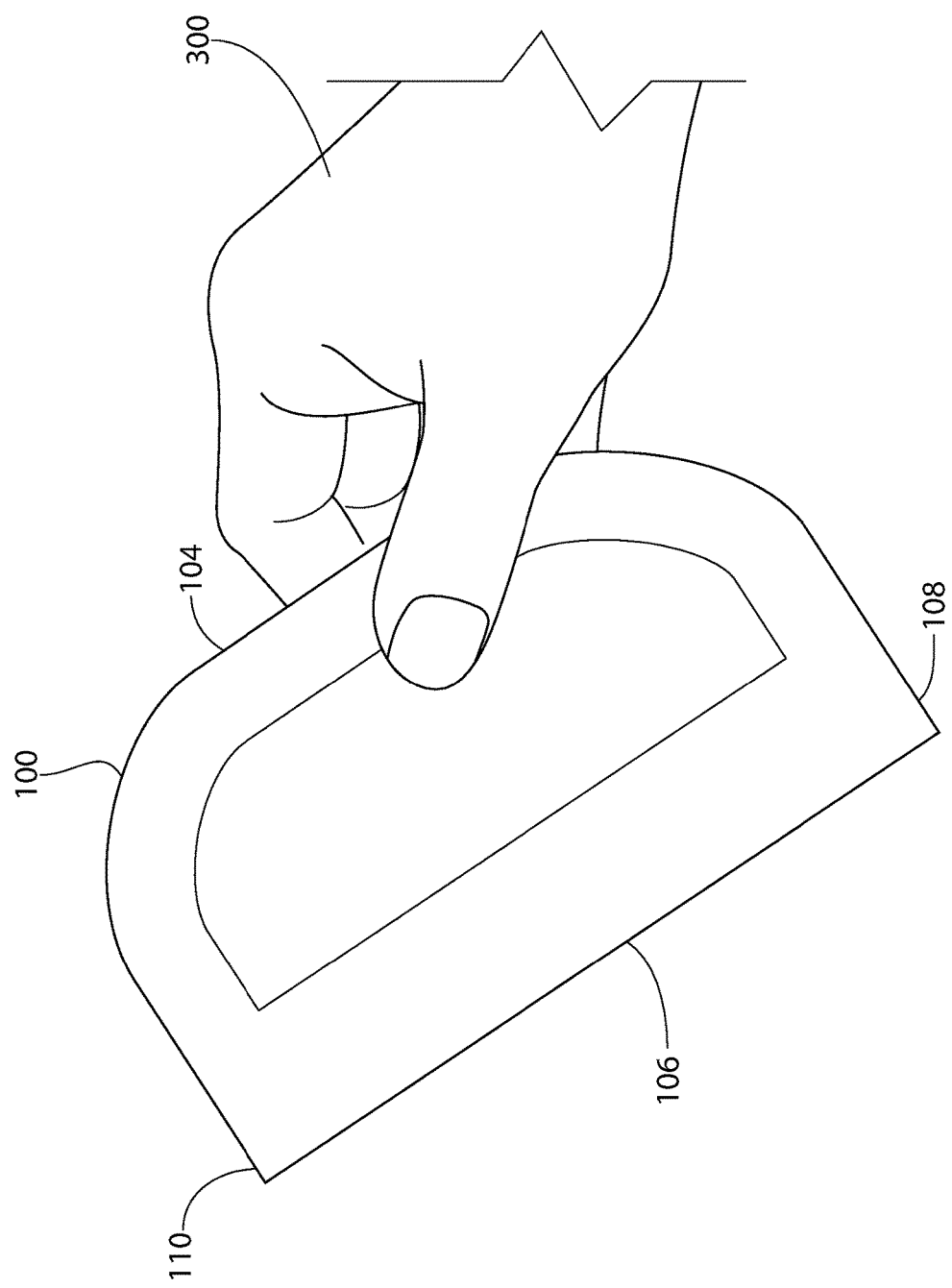
FIG. 4 is a top view of an adhesive sheet material arc application squeegee according to at least one embodiment of the present disclosure.

FIGS. 3 and 4 show an adhesive sheet material arc application squeegee 100 according to at least one embodiment of the present disclosure. As shown in FIGS. 3 and 4, the first edge 104 comprises two arcs with a straight portion in-between the two arcs. The second edge 106, proximal edge 108, and distal edge 110 are straight. As shown in FIGS. 3 and 4, the cover 200 covers the first edge 104, second edge 106, proximal edge 108, and distal edge 110. FIG. 3 shows one way a user's hand 300 can hold the adhesive sheet material arc application squeegee 100. As shown in FIG. 3, the user's hand 300 is holding the first gripping surface 112 and the second gripping surface 114, while covering the second edge 106. As shown in FIG. 3, the first edge 104 is opposite the user's hand 300 and available for use.

FIG. 4 shows one way a user's hand 300 can hold the adhesive sheet material arc application squeegee 100. As shown in FIG. 4, the user's hand 300 is holding the first gripping surface 112 and the second gripping surface 114, while covering the first edge 104. As shown in FIG. 4, the second edge 106 is opposite the user's hand 300 and available for use. In other embodiments, a user holds the first gripping surface 112 and the second gripping surface 114 in other orientations with the edge the user wishes to apply to a surface 500 opposite the user's hand 300.

Figure 5:
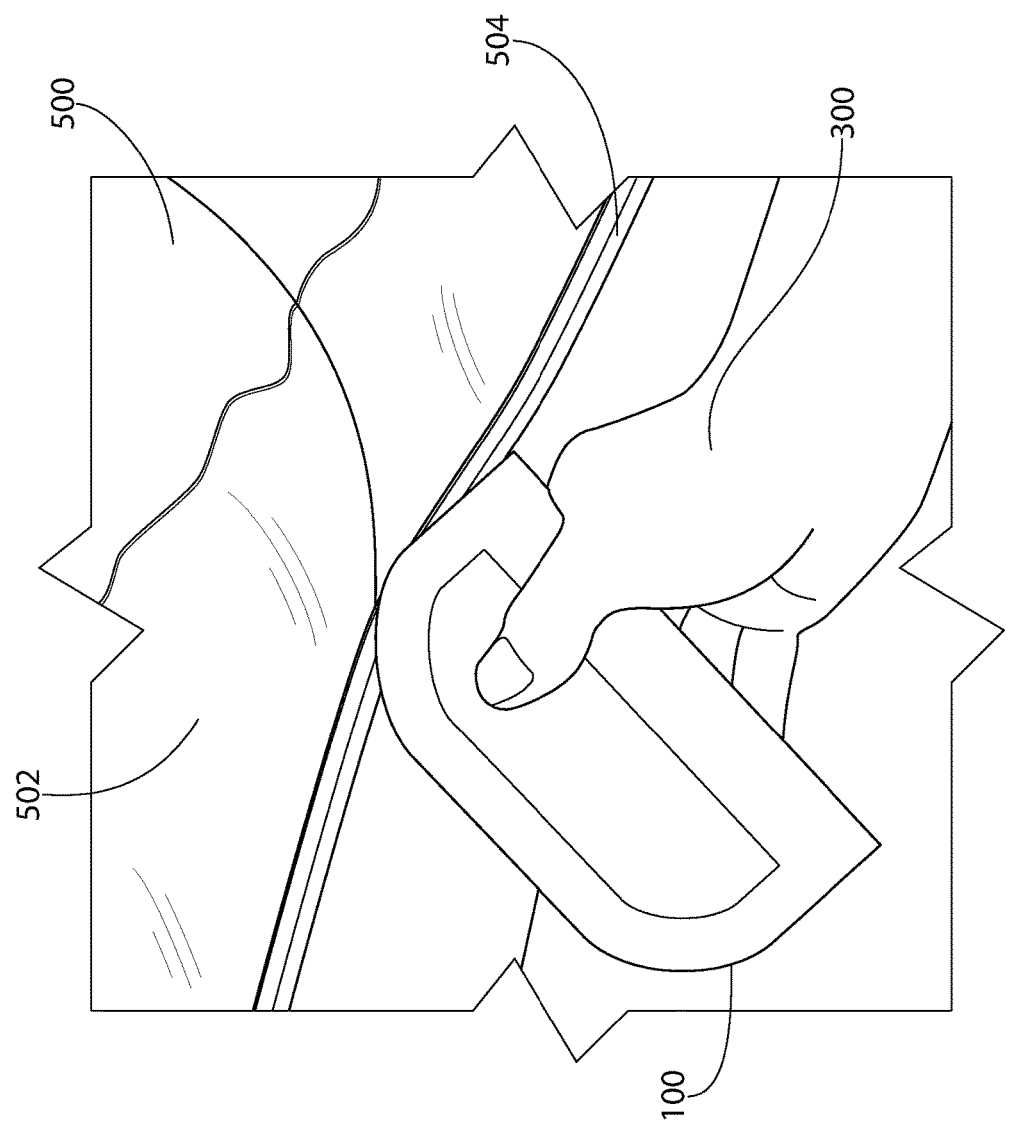
FIG. 5 is a perspective view of an adhesive sheet material arc application squeegee as used to apply a section of adhesive sheet material to a surface according to at least one embodiment of the present disclosure.

FIG. 5 shows an adhesive sheet material arc application squeegee 100 according to at least one embodiment of the present disclosure. As shown in FIG. 5, the first edge 104 comprises two arcs with a straight portion in-between the two arcs. The second edge 106, proximal edge 108, and distal edge 110 are straight. As shown in FIG. 5 the cover 200 covers the first edge 104, second edge 106, proximal edge 108, and distal edge 110. FIG. 5 shows a section of adhesive sheet material 502 that has been placed on a surface 500 with surface contour 504. As shown in FIG. 5, the surface contour 504 is a narrow channel. The adhesive sheet material arc application squeegee 100 can be used with a variety of surface contours 504, including but not limited to, variations in the surface, irregular surface features, welded obstacles, edges, textures, joints, handles and windows. As shown in FIG. 5, the adhesive sheet material arc application squeegee 100 is in use to secure the adhesive sheet material 502 to the surface 500 and surface contour 504. The user's hand 300 is holding the first gripping surface 112 and the second gripping surface 114 over the second edge 106 and applying the first edge 104 to the surface 500. Using the arced edge to apply the adhesive sheet material 100 allows a user to have more control and flexibility over the pressure applied and the portion of the surface 500 the pressure is applied to.

Figure 6:
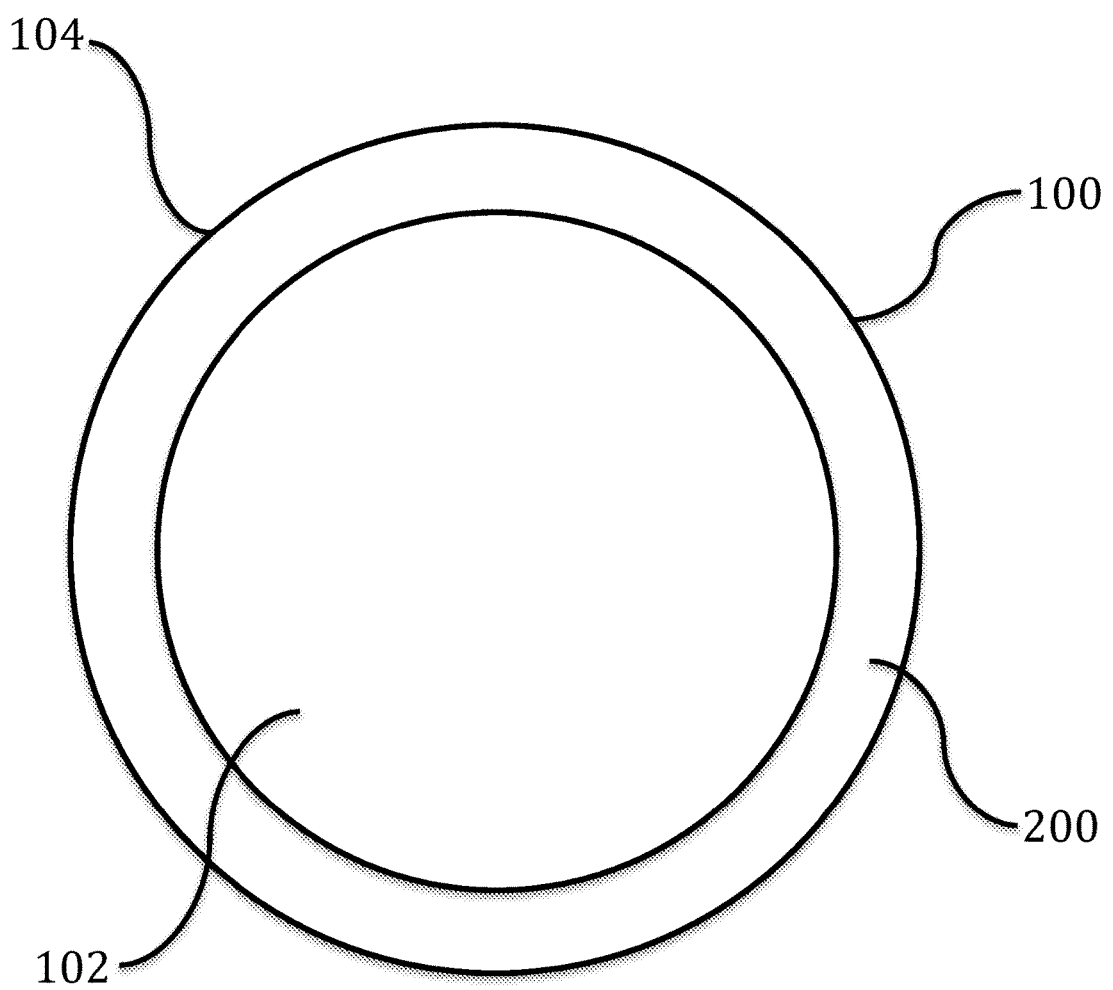
FIG. 6 is a top view of an adhesive sheet material arc application squeegee according to at least one embodiment of the present disclosure.

FIG. 6 shows an adhesive sheet material arc application squeegee 100 according to at least one embodiment of the present disclosure. The embodiment of the adhesive sheet material arc application squeegee 100 shown in FIG. 6 comprises a base 102, a first edge 104, and a cover 200. The first edge 104 comprises a single contiguous round perimeter.

Figure 7:
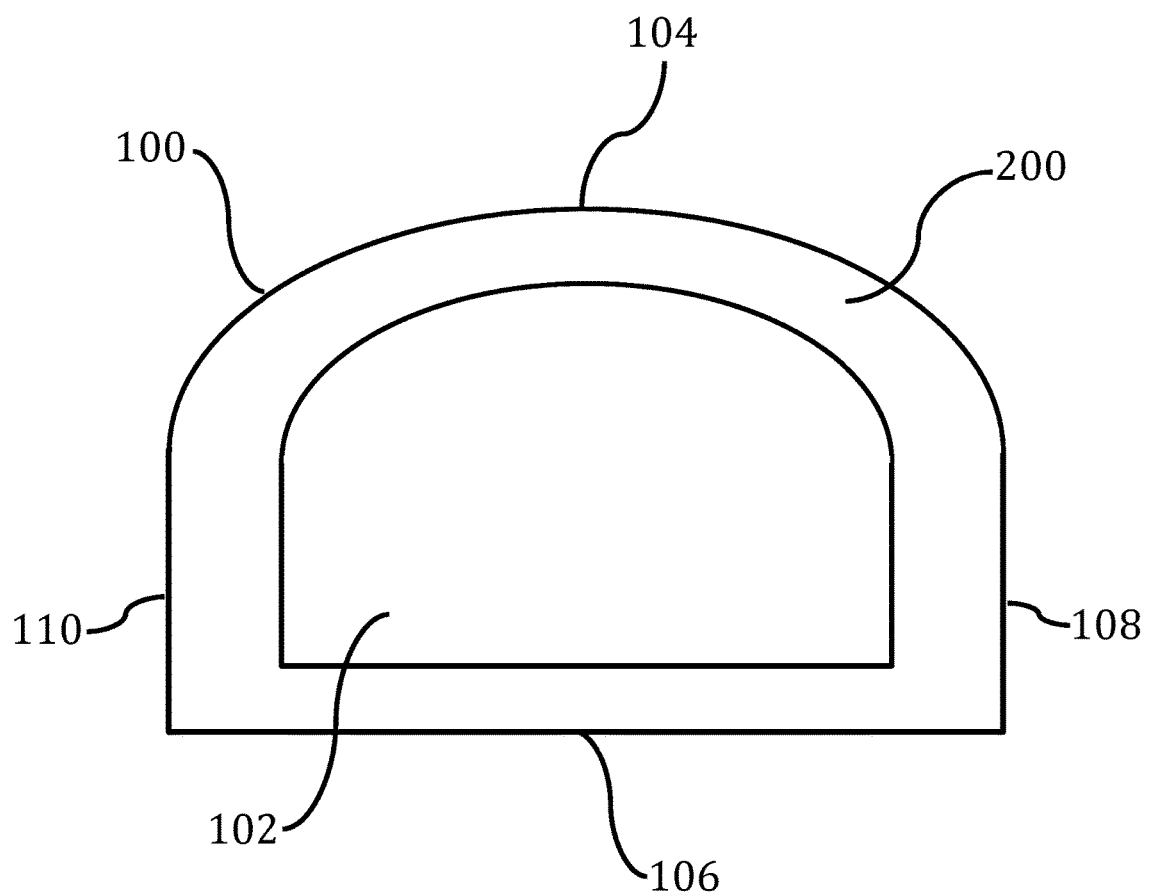
FIG. 7 is a top view of an adhesive sheet material arc application squeegee according to at least one embodiment of the present disclosure.

FIG. 7 shows an adhesive sheet material arc application squeegee 100 according to at least one embodiment of the present disclosure. The embodiment of the adhesive sheet material arc application squeegee 100 shown in FIG. 7 comprises a base 102, a first edge 104, a second edge 106, a proximal edge 108, a distal edge 110, a first gripping surface 112, a second gripping surface 114, and a cover 200. The first edge 104 comprises an arc. The second edge 106 is straight. The proximal edge 108 is straight. The distal edge 110 is straight.

In at least one embodiment, the width of the adhesive sheet material arc application squeegee 100 can range from three (3) inches to thirteen (13) inches. In at least one embodiment, the length of the adhesive sheet material arc application squeegee 100 can range from three (3) inches to thirteen (13) inches. In at least one embodiment, the thickness of the adhesive sheet material arc application squeegee 100 can range from 0.03 inches to 1 inch. In at least one embodiment, the thickness of the adhesive sheet material arc application squeegee 100 varies over the first gripping surface 112 and the second gripping surface 114. In at least one embodiment, the thickness of the adhesive sheet material arc application squeegee is greater over the portion of the base 102 covered by the cover 200 than over the portion of the base 102 not covered by the cover 200. In at least one embodiment, the radius of the edge arc can range from 0.03 inches to 24 inches.

In at least one embodiment, the first edge 104 is straight. In at least one embodiment, the first edge 104 comprises multiple arcs. In at least one embodiment, the first edge 104 comprises at least one symmetric arc. In at least one embodiment, the first edge 104 comprises at least one asymmetric arc. In at least one embodiment, the second edge 106 is an arc. In at least one embodiment, the second edge 106 comprises multiple arcs. In at least one embodiment, the second edge 106 comprises at least one symmetric arc. In at least one embodiment, the second edge 106 comprises at least one asymmetric arc. In at least one embodiment, the proximal edge 108 is an arc. In at least one embodiment, the proximal edge 108 comprises multiple arcs. In at least one embodiment, the proximal edge 108 comprises at least one symmetric arc. In at least one embodiment, the proximal edge 108 comprises at least one asymmetric arc. In at least one embodiment, the distal edge 110 is an arc. In at least one embodiment, the distal edge 110 comprises multiple arcs. In at least one embodiment, the distal edge 110 comprises at least one symmetric arc. In at least one embodiment, the distal edge 110 comprises at least one asymmetric arc. In at least one embodiment, the base 102 comprises a first edge 104, wherein the first edge 104 is a symmetric single contiguous round perimeter. In at least one embodiment, the base 102 comprises a first edge 104, wherein the first edge 104 is a asymmetric single contiguous round perimeter.

In all embodiments of the present disclosure, at least one edge comprises at least one arc. In all embodiments of the present disclosure, the at least one arc of the at least one edge is convex, i.e. bulging outward, in relation to the base 102.

The base 102 material can be, but is not limited to being, rubber, silicone, composites, metal, leather, various polymers, polytetrafluoroethylene (PTFE), nylon, and/or various plastics. In at least one embodiment, the base 102 comprises a flexible material. In at least one embodiment, the base 102 comprises a strong material. In at least one embodiment, the base 102 material comprises polytetrafluoroethylene (PTFE). In at least one embodiment, the base 102 material comprises nylon. In at least one embodiment, the first gripping surface 112 is rounded. In at least one embodiment, the second gripping surface 114 is rounded. In at least one embodiment, at least one surface of the base 102 is rough.

In at least one embodiment, at least one surface of the base 102 is smooth. In at least one embodiment, the first gripping surface 112 and the second gripping surface 114 are tapered. In at least one embodiment, the tapered surfaces are thickest in the middle of the base 102 and thinnest at the edges. In at least one embodiment, the location of the thickest and thinnest parts of the tapered surfaces varies.

The cover 200 material can be, but is not limited to being, fabric, upholstery fabric, synthetic fabric, suede leather, leather, microfiber polyester blend, synthetic suede, wool, cotton, various synthetic materials, various polymers, and/or micro-fiber cloth. In at least one embodiment, the cover 200 comprises a low friction material. In at least one embodiment, the cover 200 comprises a material with a coefficient of friction less than 0.6 when used in connection with adhesive sheet material 502. In at least one embodiment, the cover 200 comprises soft material. In at least one embodiment, the cover 200 comprises a durable long lasting material. In at least one embodiment, the cover 200 comprises a material that can be used on surfaces with temperatures at least up to 250 degrees Fahrenheit. In at least one embodiment, the cover 200 comprises a material that maintains its shape and quality when wet. In at least one embodiment, the cover 200 material comprises a microfiber polyester blend. In at least one embodiment, the cover 200 material comprises a synthetic suede.

In at least one embodiment, the cover 200 covers the entire perimeter of the base 102. In at least one embodiment the cover 200 covers only a portion of the perimeter of the base 102. In at least one embodiment, the cover 200 covers all surfaces of the base 102. In at least one embodiment, the cover 200 covers only one of the following: first edge 104, second edge 106, proximal edge 108, and distal edge 110. In at least one embodiment, the cover 200 covers only two of the following: first edge 104, second edge 106, proximal edge 108, and distal edge 110. In at least one embodiment, the cover 200 covers only three of the following: first edge 104, second edge 106, proximal edge 108, and distal edge 110.

The cover 200 can be secured, but is not limited to being secured, to the base 102 with adhesive tape, glue, or thread. In at least one embodiment, the cover 200 is sewn to the base 102. In at least one embodiment, material is inserted in between the cover 200 and base 102 before securing the cover 200 to increase the thickness of the covered portions of the adhesive sheet material arc application squeegee 100. In at least one embodiment, one cover 200 is secured to the base 102. In at least one embodiment, more than one cover 200 is secured to the base 102.

In at least one embodiment, the base 102 has fewer than two ribs 202. In at least one embodiment, the base 102 has more than two ribs. In at least one embodiment, the rib 202 comprises a rectangular prism. In at least one embodiment, the adhesive sheet material arc application squeegee 100 does not have any ribs 202. In at least one embodiment, the rib 202 protrudes out of only one surface of the base 102. In at least one embodiment, the width of the rib 202 can range from three 0.03 inches to 1 inch. In at least one embodiment, the length of the rib 202 can range from three (3) inches to thirteen (13) inches. In at least one embodiment, the thickness of the rib 202 can range from 0.03 inches to 1 inch. In at least one embodiment, the rib 202 comprises the same material as the base 102. In at least one embodiment, the rib 202 comprises a different material than the base 102. The rib 202 material can be, but is not limited to being, rubber, silicone, composites, metal, leather, various polymers, polytetrafluoroethylene (PTFE), nylon, and/or various plastics.

In at least one embodiment, the rib 202 is rough. In at least one embodiment, the rib 202 is smooth. In at least one embodiment, the rib surface is rounded. In at least one embodiment, the rib 202 is smooth. In at least one embodiment, the rib 202 surface is flat. In other embodiments, the rib 202 can be any deviation from the surface of the base 102, including but not limited to, bumps, groves, and notches.

In at least one embodiment, the base 102 has more than one anchor 204. In at least one embodiment, the base has less than one anchor 204. In at least one embodiment, the anchor 204 can be located anywhere on the base 102. In at least one embodiment, the anchor 204 comprises ferromagnetic material. In at least one embodiment, the anchor 204 comprises a magnet. In at least one embodiment, the anchor 204 comprises a hook and loop fastener. In at least one embodiment, the anchor 204 comprises a snap fastener. In at least one embodiment, the anchor 204 can be any fastener that allows a user to secure the anchor 204 to a utility-band wore by the user and allows for one-handed removal and securing. In at least one embodiment, the anchor 204 can be any fastener that allows a user to secure the anchor 204 to a nearby surface and allows for one-handed removal and securing. In at least one embodiment, the anchor 204 is inside of the base 102. In at least one embodiment, the anchor 204 is on the first gripping surface 112. In at least one embodiment, the anchor 204 is on the second gripping surface 114.

In at least one embodiment, the adhesive sheet material arc application squeegee 100 can be washed in a washing machine. In at least one embodiment, the adhesive sheet material arc application squeegee 100 can be used when wet. In at least one embodiment, the adhesive sheet material arc application squeegee 100 can be used when the adhesive sheet material 502 is wet. In at least one embodiment, the adhesive sheet material arc application squeegee 100 should not be exposed to water. In at least one embodiment, the adhesive sheet material arc application squeegee 100 comprises materials that can be used on surfaces with temperatures at least up to 250 degrees Fahrenheit.

Figure 8:
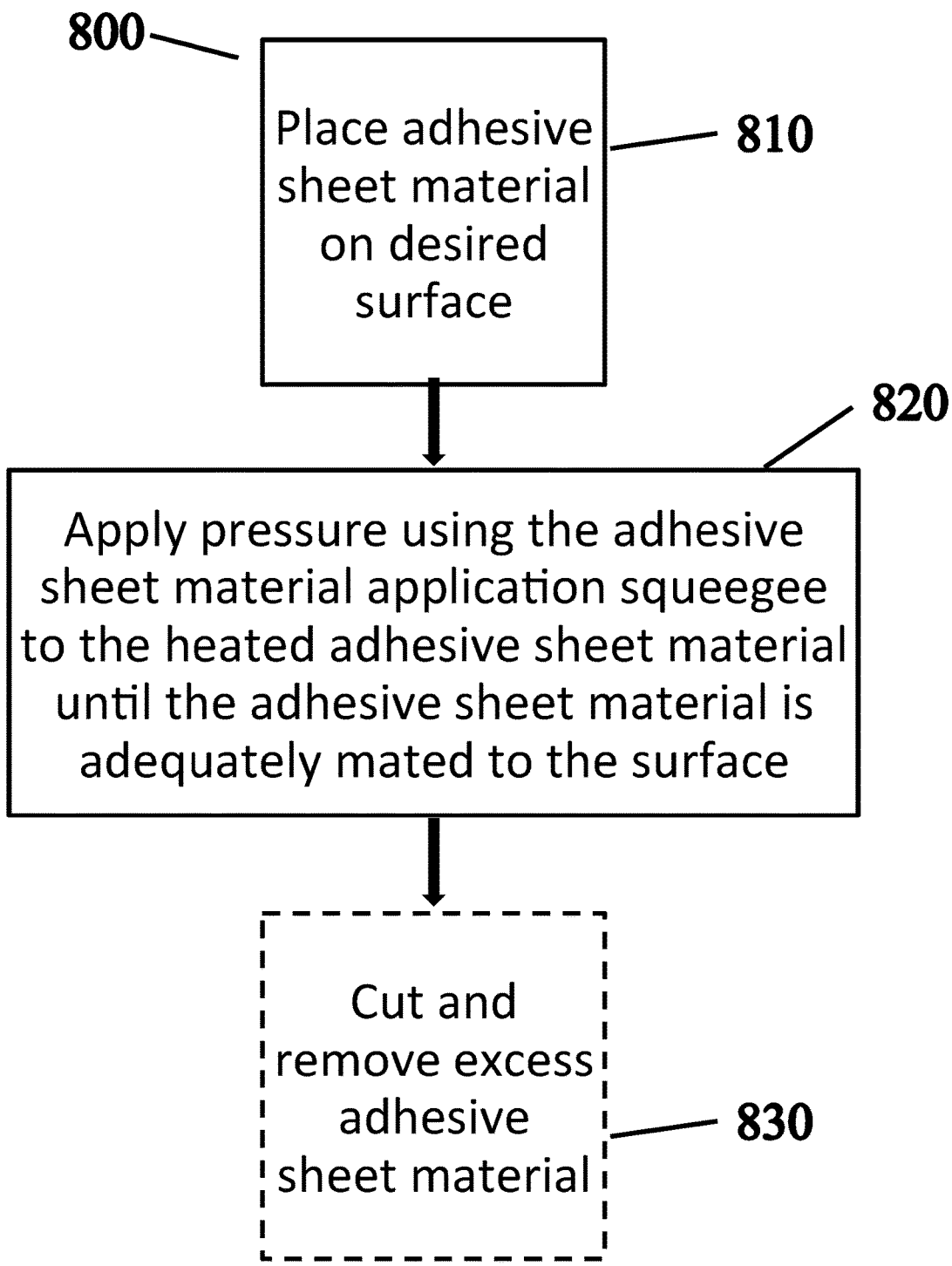
FIG. 8 shows a method of using an adhesive sheet material arc application squeegee according to at least one embodiment of the present disclosure.

FIG. 8 shows a flow chart illustrating a method of using the adhesive sheet material arc application squeegee 100 according to at least one embodiment of the present disclosure. In step 810 of FIG. 8, a user places the adhesive sheet material 502 on a desired surface 500. In at least one embodiment, the adhesive sheet material 502 is placed over a surface contour 504. In at least one embodiment, the surface is cleaned prior to applying the adhesive sheet material 502. In step 820 of FIG. 8, a user applies pressure using the adhesive sheet material arc application squeegee 100 to the adhesive sheet material until the adhesive sheet material 502 is adequately mated to the surface 500. In at least one embodiment, the user places the arc edge of the adhesive sheet material arc application squeegee 100 on the adhesive sheet material 502. In at least one embodiment, the adhesive sheet material arc application squeegee 100 is used to apply adequate pressure to form the adhesive sheet material 502 to fit securely around and in a surface contour 504. In at least one embodiment, a user heats the adhesive sheet material 502 using a heat source, including, but not limited to, an electric heat gun or a propane or other combustible gas torch, before the user applies pressure using the adhesive sheet material arc application squeegee 100. In at least one embodiment, a user wets the adhesive sheet material 502 before the user applies pressure using the adhesive sheet material arc application squeegee 100. In at least one embodiment, a user wets the adhesive sheet material arc application squeegee 100 before the user applies pressure to the adhesive sheet material 502 using the adhesive sheet material arc application squeegee 100. The liquid used to wet the adhesive sheet material 502 or the adhesive sheet material arc application squeegee 100, can be but is not limited to being, water and soapy water. In optional step 830 of FIG. 8, a user cuts and removes the excess adhesive sheet material 502 after the surface 500 has been covered in the desired pattern.

While various embodiments of an adhesive sheet material arc application squeegee and methods for using the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

What is claimed is:

1. An adhesive sheet material application squeegee comprising:
    a first edge and two adjacent lateral edges;
    a first gripping surface disposed between said adjacent lateral edges;
    at least one cover;
    wherein the first edge defines a continuous convex line comprising a convex arcuate portion respectively adjacent both of said adjacent lateral edges such that said first edge continuously transitions to said two adjacent lateral edges through said convex arcuate portions,
    and wherein said at least one cover is secured over at least a portion of the first edge and at least a portion of the first gripping surface.

2. The adhesive sheet material application squeegee of claim 1, wherein said two adjacent lateral edges comprise:
    a distal lateral edge adjacent first edge;
    a proximal lateral edge adjacent the first edge;
    a second edge adjacent the distal lateral edge and the proximal lateral edge; and
    wherein the at least one cover is secured over at least a portion of the distal lateral edge or at least a portion of the proximal lateral edge.

3. The adhesive sheet material application squeegee of claim 2, wherein the at least one cover is secured over at least a portion of the distal edge and at least a portion of the proximal edge.

4. The adhesive sheet material application squeegee of claim 1, wherein the first gripping surface comprises a first rib and the first rib protrudes from the first gripping surface.

5. The adhesive sheet material application squeegee of claim 4, wherein the width of the first rib can range from 0.03 inches to 1 inch.

6. The adhesive sheet material application squeegee of claim 4, wherein a portion of the surface of the first rib is rounded.

7. The adhesive sheet material application squeegee of claim 1, wherein the cover is secured to the first gripping surface with adhesive.

8. The adhesive sheet material application squeegee of claim 1, wherein the cover is sewn to the first gripping surface.

9. An adhesive sheet material application squeegee comprising:

a first edge;

a distal lateral edge adjacent the first edge;

a first gripping surface;

at least one cover; and wherein the first edge defines a continuous convex line comprising a convex arcuate portion adjacent said distal lateral edge such that said first edge continuously transitions to said distal lateral edge through said convex arcuate portion, and wherein said at least one cover is secured over at least a portion of the first edge, at least a portion of the first gripping surface, and at least a portion of the distal lateral edge.

10. The adhesive sheet material application squeegee of claim 9, wherein the first edge is symmetric.

11. The adhesive sheet material application squeegee of claim 9, wherein the first edge is asymmetric.

12. The adhesive sheet material application squeegee of claim 9, wherein a radius of the convex arcuate portion is in the range of from 0.03 inches to 24 inches.

13. The adhesive sheet material application squeegee of claim 9, wherein the cover covers only a portion of the first edge and only a portion of the distal lateral edge.

14. The adhesive sheet material application squeegee of claim 9, wherein the cover covers the entire first edge and only a portion of the distal lateral edge.

15. The adhesive sheet material application squeegee of claim 9, further comprising a second gripping surface opposite said first gripping surface;

wherein the cover is secured to at least a portion of the second gripping surface.

\* \* \* \* \*